(12) United States Patent
Wheeler

(10) Patent No.: X5878
(45) Date of Patent: Mar. 15, 1830

(54) WATER WHEEL

(76) Inventor: John R. Wheeler

John R Wheeler Pittsford. Monroe Co. New York,
Letters Patent,

The Schedule referred to in these Letters Patent and making part of the same containing a description in the words of the sd John R Wheeler himself of his improvement in Water Wheels, To all Persons to whom these presents shall come John R Wheeler of the Town of Pittsford, County of Monroe & State of New York Sends Greeting. Be it known that I, the said John R Wheeler have invented constructed & applied to use, new & useful improvements in Water Wheels, which improvements are contained in a Machine, called by me the "Union Water Wheel" and are specified, together with the wheel in the words following, viz: The Wheel containing said improvements is a horizontal wheel, & may be made any number of feet in diameter according to the head of water and the purpose to which the wheel is to be applied. The size of the wheel selected for description herein is six feet in diameter and eleven inches in depth, but the depth of the wheel and diameter vary according to circumstances. The wheel has 4 arms about four feet long, nine inches wide & three inches thick locked together with a dove tail so as to form a square in the centre of about sixteen inches, to receive the upright shaft when the same is made of wood, but when an iron shaft is used the square is to be made proportionably smaller, said arms to extend thro' the inner rim. There are two rims about nine inches apart each eleven inches wide being the whole depth of the wheel and three inches thick, the outer rim enclosing the whole of said wheel. Between said rims are cast iron buckets of about one fourth of an inch thick & let into each rim about two fourth of an inch but said buckets may be made of either iron or wood - The buckets are an irregular concave and the part of the buckets at the outer rim or the side on which the water acts, is twelve inches from a line drawn perpendicular from the top of the buckets & the
lower part of the buckets at the inner rim is five inches from a
line drawn perpendicular from the top of the buckets. the upp
edge of the buckets from one rim to the other to be straight. The
buckets are to be so made & placed in the rims of the wheel, that
a line drawn perpindecular from the top of the centre of the buck
-ets will cut the centre of the buckets one inch and a half from
the top, which inch & a half of the top of the buckets, is to be a
little concave and that two inches from the top, the concavity
from outside to inside to be about one fourth of an inch & nine
inches from the top the concavity from the outside to the inside
to be about three fourths of an inch & to continue the same to the
bottom, each side of the buckets is to be a true curve, except
one inch and a half at the top. the curvature on the outer edge
is about one inch and the curvature on the inner edge is about
three fourths of an inch & this difference arises from the outer
edge of the buckets being longer than the inner, but the con-
cavity & curvature to be varied according to the depth of the
wheel which may be more or less than eleven inches. The buck
-ets to be placed from twelve to fifteen inches apart. The wheel
may be made wholly of iron or wholly of wood, or it may be made
partly of iron & partly of wood.

The Specific new & useful improvements here-
in before described and claimed by me as the inventor, are the
following. First. The manner of making & putting together
the arms. Second The Iron buckets. Third The shape of the
buckets. Fourth The manner of letting them into the rims.

The advantage of this wheel over all others for the same pur
pose, is that the water acts and reacts upon the buckets
in such a manner as greatly to increase the power. The iron
buckets wear smoother, are more durable & being thinner
have a less effect in breaking the current of water, and the
manner of letting the buckets into the rims, & of making and

United States Patent

Patent No.: X5878 putting the arms together, render the wheel firmer and more durable.

witnesses
Elias P Holmes
Geo Bellows

John R Wheeler

Exd: Hyde
(832 words)

(Patented 15th March 1830)